(12) United States Patent
Faddegon et al.

(10) Patent No.: US 11,317,252 B2
(45) Date of Patent: Apr. 26, 2022

(54) ECHO AVOIDANCE IN LARGE VOLUME SYSTEM-WIDE CALLS

(71) Applicant: MOTOROLA SOLUTIONS, INC., Chicago, IL (US)

(72) Inventors: Maarten Faddegon, Copenhagen (DK); Yunhai Yang, Elgin, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 22 days.

(21) Appl. No.: 16/942,973

(22) Filed: Jul. 30, 2020

(65) Prior Publication Data

US 2022/0038863 A1 Feb. 3, 2022

(51) Int. Cl.
*H04W 4/06* (2009.01)
*H04W 4/029* (2018.01)

(52) U.S. Cl.
CPC ............ *H04W 4/06* (2013.01); *H04W 4/029* (2018.02)

(58) Field of Classification Search
CPC ......... H04W 4/10; H04W 76/45; H04W 4/08; H04W 84/08; H04W 4/06; H04W 4/02; H04W 4/029
See application file for complete search history.

(56) References Cited

U.S. PATENT DOCUMENTS

| | | | |
|---|---|---|---|
| 8,189,460 B2 | 5/2012 | Shaffer et al. | |
| 8,260,338 B2 | 9/2012 | Shaffer et al. | |
| 2002/0016708 A1 | 2/2002 | Houh | |
| 2006/0046741 A1* | 3/2006 | Loesch | H04W 8/186 455/456.1 |
| 2008/0200198 A1* | 8/2008 | Zhang | H04W 4/10 455/518 |
| 2013/0316686 A1* | 11/2013 | Subbaramoo | H04W 12/02 455/418 |
| 2015/0173111 A1* | 6/2015 | Agarwal | H04L 63/0884 370/329 |
| 2017/0019164 A1* | 1/2017 | Sonobe | H04B 7/14 |
| 2019/0158673 A1* | 5/2019 | Cannata | H04M 9/001 |

FOREIGN PATENT DOCUMENTS

| | | |
|---|---|---|
| EP | 2186230 B1 | 9/2014 |
| WO | 2007021586 A2 | 2/2007 |

\* cited by examiner

*Primary Examiner* — Keith Ferguson

(57) ABSTRACT

A method and system to avoid echo in large volume calls is provided. A Land Mobile Radio (LMR) core network receives audio packets for audio packets intended for a plurality of mobile devices. The Smart Connect Gateway determines a geographic location of each of the plurality of mobile devices. The Smart Connect Gateway transmits the audio packets to the plurality of mobile devices based upon the geographic location of each of the plurality of mobile devices.

20 Claims, 3 Drawing Sheets

ECHO AVOIDANCE IN LARGE VOLUME SYSTEM-WIDE CALLS

BACKGROUND OF THE INVENTION

To make a system-wide call in a Land Mobile Radio (LMR) system, the LMR system preempts all active traffic services except for emergency calls. A broadband Push-To-Talk (BPTT) cloud service replicates audio packets for each client, such as each mobile device or subscriber, connected to the BPTT service.

System-wide calls can include thousands of recipients. If two recipients are located near each other, and one receives the audio packets at the beginning of the transmission and one receives them at the end of the transmission, there can be significant echo between the two mobile devices. For small groups this echo problem is not a significant issue. However, for large groups of recipients the echo can be very troublesome.

Therefore a need exists for a method and system to avoid echo in large volume system-wide calls.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description below, are incorporated in and form part of the specification and serve to further illustrate various exemplary embodiments of concepts that include the claimed invention, and to explain various principles and advantages of those exemplary embodiments.

Figure 1:
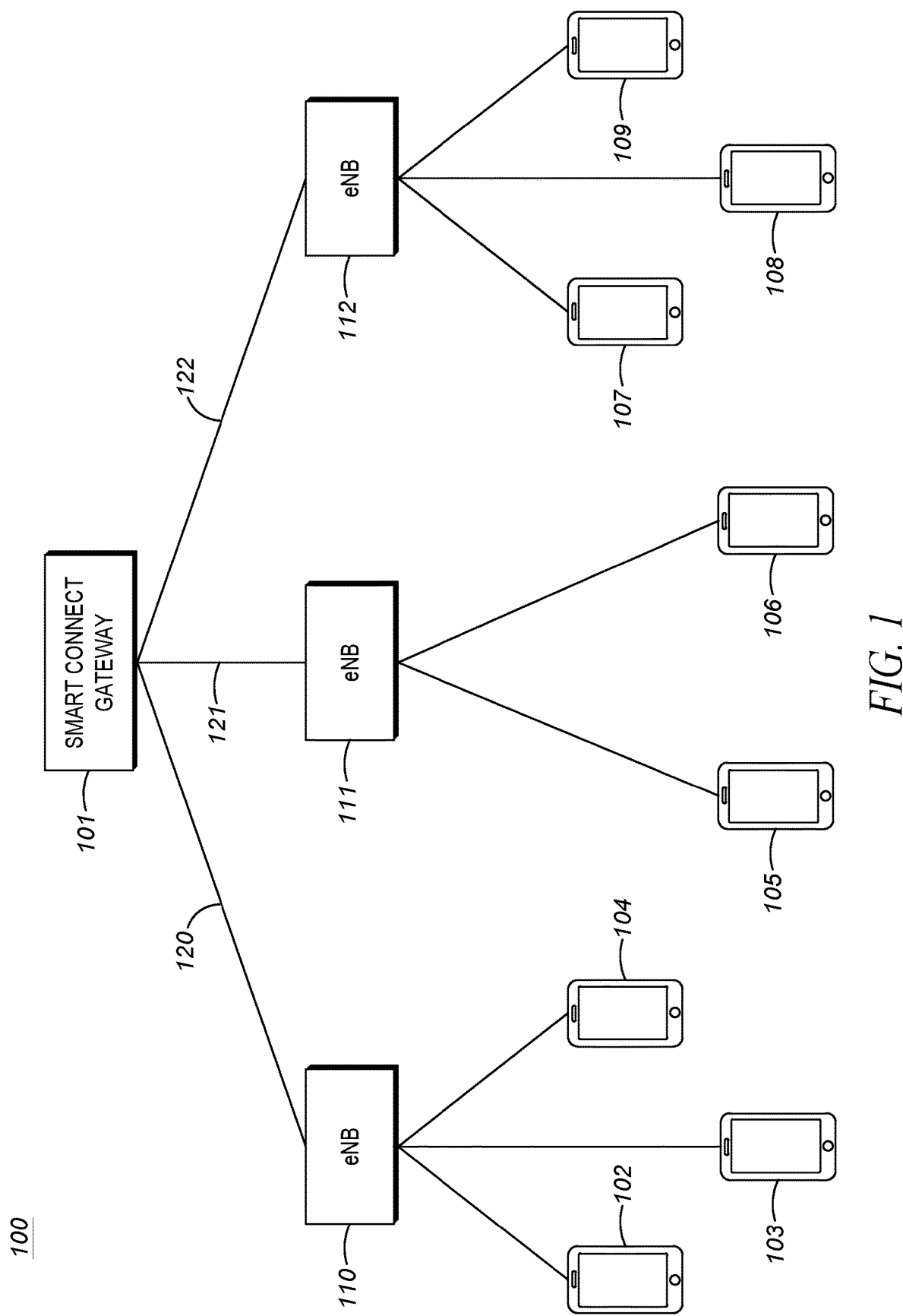
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

An exemplary embodiment provides solutions to avoid echo in large volume calls, such as system-wide calls. In accordance with an exemplary embodiment, a Smart Connect Gateway receives audio packets for a group call. In an exemplary embodiment, the group call is a large volume system-wide call, for example a call including up to seven thousand mobile units. The group call can be, for example, a system-wide announcement intended for all mobile devices on the network.

The Smart Connect Gateway determines a geographic location of each of the plurality of mobile devices. As described in detail below, this can be accomplished using advanced LMR grouping, such as multigroups, supergroups, and users who scan a different talkgroup than their current talkgroup. This can also be accomplished using additional client information, such as location based on GPS, current LTE cell, Wi-Fi SSID, a Bluetooth beacon, broadband type (such as satellite, Wi-Fi, or LTE signal), or distance based on adjacency obtained by Bluetooth of Wi-Fi discovery. This information can then be used with LMR talkgroup, estimated distance, actual distance, LTE cell, a distance from a common beacon, the distance between users derived from indoor location based on triangulation of multiple Bluetooth beacons, distance between users based on another method to determined indoor location, and/or location based on broadband type.

The Smart Connect Gateway transmits the audio packets to the mobile devices based upon the geographic location of each of the mobile devices.

Each of the above-mentioned embodiments will be discussed in more detail below, starting with example system and device architectures of the system in which the embodiments may be practiced, followed by an illustration of processing blocks for achieving an improved technical method, device, and system for avoiding echo in large volume system-wide calls. Exemplary embodiments are herein described with reference to flowchart illustrations, call flow diagrams, and/or block diagrams of methods, apparatus (systems) and computer program products according to exemplary embodiments. It will be understood that each block of the flowchart illustrations, call flow diagrams, and/or block diagrams, and combinations of blocks in the flowchart illustrations, call flow diagrams, and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart, call flow, and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

FIG. 1 depicts a system diagram of a communication system 100 in accordance with an exemplary embodiment of the present invention. Communication system 100 includes a Smart Connect Gateway 101, evolved NodeB (eNB) 110, eNB 111, eNB 112, and communication devices 102-109. Although eNBs are depicted in FIG. 1, alternative transports can be used to connect a mobile device to Smart Connect Gateway 101. Examples of such devices includes Wi-Fi connections and satellite devices. Communication devices 102-109 are sometimes referred to as subscriber units. Although only three eNBs 110-112 are depicted in FIG. 1, it should be understood that a typical communication system 100 would include a plurality of sites, and that communication devices 102-109 could move about and connect to multiple of these plurality of sites as registered sites and adjacent sites.

Connection 120 preferably connects eNB 110 and Smart Connect Gateway 101 and this connection is preferably an Internet Protocol (IP) connection. The IP connection connects a site controller of eNB HO to the site's Zone Controller located thin Smart Connect Gateway 101.

Connection 121 preferably connects eNB 111 and Smart Connect Gateway 101 and this connection is preferably an IP connection. The IP connection connects a site controller of eNB 111 to the site's Zone Controller located within Smart Connect Gateway 101.

Connection 122 preferably connects eNB 112 and Smart Connect Gateway 101 and this connection is preferably an IP connection. The IP connection connects a site controller of eNB 112 to the site's Zone Controller located within Smart Connect Gateway 101.

Smart Connect Gateway 101 preferably includes multiple sites in addition to eNBs 110-112, although only three sites are shown in FIG. 1 for clarity. Smart Connect Gateway 101 preferably includes a Zone Controller (ZC), a PM, a Unified Endpoint Management (UEM), and a Link Management Protocol (LMP). LMR Core 101 also preferably includes a Mobility Management Entity (MME) that is in charge of functions related to end-user authentication and a deployable home subscriber server for storing user-related and subscription-related information to LMR Core 101 to successfully complete network entry authentication of communication devices.

eNBs 110-112 handle data traffic and each include a network of base stations (not shown), each of which functions as a base station for Smart Connect Gateway 101. eNBs 110-112 use the base stations to forward user data and signaling between Smart Connect Gateway 101 and communication devices 102-109.

Communication devices 102-109 are preferably portable electronic communication devices that can be used for sending voice or data to other communication devices.

Figure 2:
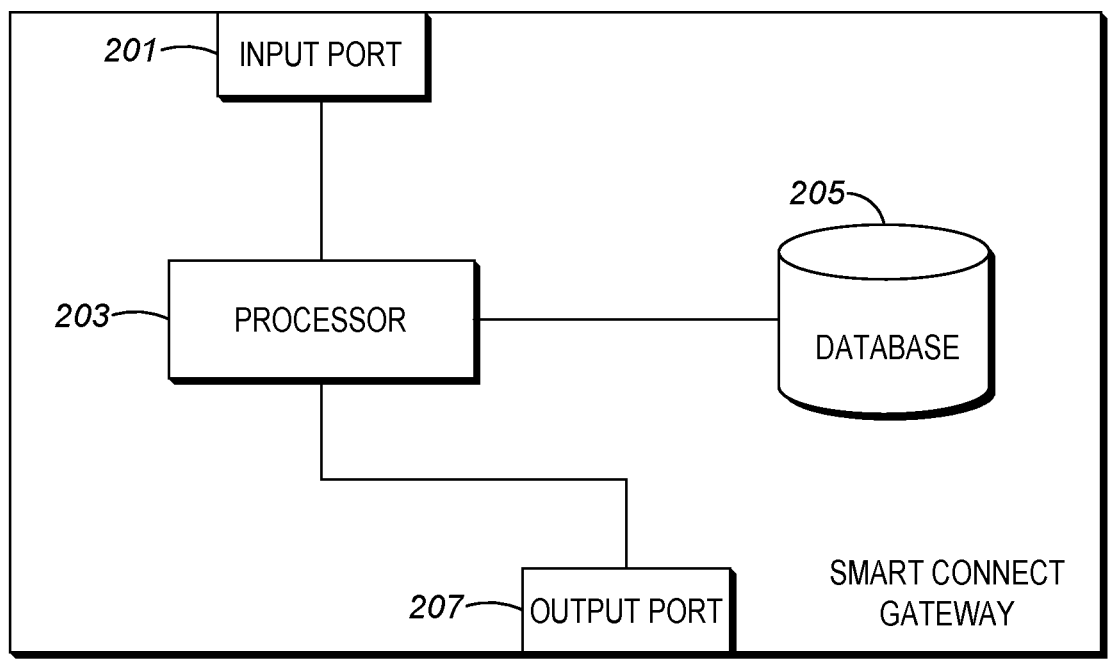
FIG. 2 depicts a schematic diagram of a Smart Connect Gateway in accordance with an exemplary embodiment of the present invention.

FIG. 2 depicts a schematic diagram of Smart Connect Gateway 101 in accordance with an exemplary embodiment of the present invention. In the exemplary embodiment depicted in FIG. 2, Smart Connect Gateway 101 includes an input port 201, a processor 203, a database 205, and an output port 207. Input port 201 and processor 203 communicate over one or more communication lines or buses, as do processor 203 and output port 207. Wireless connections or a combination of wired and wireless connections are also possible.

Input port 201 receives electronic signals and messages from eNB 110, eNB 111, and eNB 112. Output port 207 transmits signals and messages to eNB 110, eNB 111, and eNB 112. Input port 201 and output port 207 are electrically connected to processor 203. Although depicted in FIG. 2 as two separate elements, input port 201 and output port 207 can be a single element.

Processor 203 may include a microprocessor, application-specific integrated circuit (ASIC), field-programmable gate array, or another suitable electronic device. Processor 203 obtains and provides information (for example, from database 205 and/or input port 201), and processes the information by executing one or more software instructions or modules, capable of being stored, for example, in a random access memory ("RAM") area of database 205 or a read only memory ("ROM") of database 205 or another non-transitory computer readable medium. The software can include firmware, one or more applications, program data, filters, rules, one or more program modules, and other executable instructions. Processor 203 is configured to retrieve from database 205 and execute, among other things, software related to the control processes and methods described herein.

Database 205 can include one or more non-transitory computer-readable media, and may include a program storage area and a data storage area. The program storage area and the data storage area can include combinations of different types of memory, as described herein. In the embodiment illustrated, database 205 stores, among other things, instructions for processor 203 to carry out the method of FIG. 3.

Figure 3:
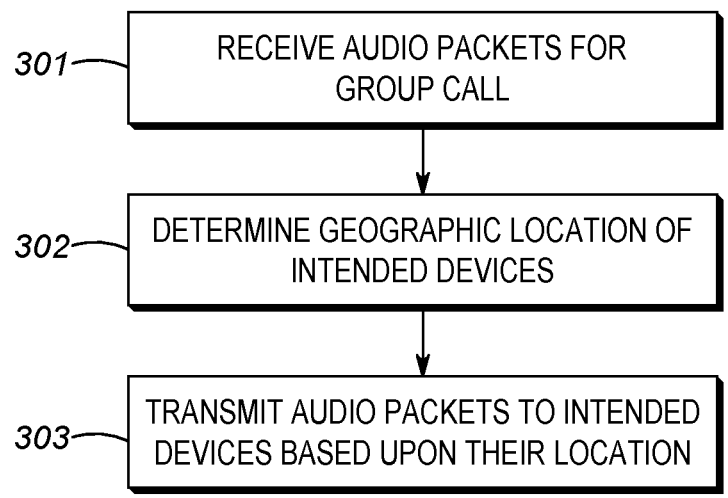
FIG. 3 depicts a flow chart in accordance with an exemplary embodiment of the present invention.

FIG. 3 depicts a flow chart 300 of a method to avoid echo in large volume broadband calls in accordance with an exemplary embodiment of the present invention.

Smart Connect Gateway 101 receives (301) audio packets for a group call. The audio packets are preferably intended for a plurality of communication devices. In an exemplary embodiment, the group call is a system-wide announcement intended for all mobile devices on the network.

Smart Connect Gateway 101 determines (302) a geographic location of each of the plurality of communication devices. In accordance with a first exemplary embodiment, Smart Connect Gateway 101 determines the geographic location of each of the plurality of communication devices using LMR talkgroup grouping. In accordance with a first aspect of this exemplary embodiment, a first group of mobile devices are affiliated to a first talkgroup and a second group of mobile devices are affiliated to a second talkgroup. In the situation where the first talkgroup and the second talkgroup are part of the same LMR multigroup, the streams for the mobile devices in the second talkgroup are sent immediately following the audio streams sent to mobile devices in the first talkgroup. In accordance with a second aspect of this exemplary embodiment, a first group of mobile devices are affiliated to a first talkgroup and a second group of mobile devices are affiliated to a second talkgroup. In the situation where the first talkgroup and the second talkgroup are part of the same LMR supergroup, the streams for the mobile devices in the second talkgroup are sent immediately following the audio streams sent to mobile devices in the first talkgroup. In accordance with a third aspect of this exemplary embodiment, a first group of mobile devices are affiliated to a first talkgroup and a second group of mobile devices are affiliated to a second talkgroup. In the situation where some mobile devices of the second talkgroup scan the first talkgroup, the streams for the mobile devices in the second talkgroup are sent immediately following the audio streams sent to mobile devices in the first talkgroup. It should be understood that the audio streams could be sent to the mobile devices in the second talkgroup immediately before the audio streams sent to the mobile devices in the first talkgroup. By sending them immediately after one another, or even close to one another without being immediately preceding or following, the likelihood of echo due to a large gap in reception by the mobile devices is avoided.

In accordance with a second exemplary embodiment, Smart Connect Gateway 101 determines the geographic location of each of the plurality of communication devices using subscriber information. In accordance with a first aspect of this exemplary embodiment, the GPS position of each mobile device is obtained, and the mobile devices are sorted by LMR talkgroup and estimated distance. It should be understood that the audio streams could be sent to the mobile devices in the second talkgroup immediately before the audio streams sent to the mobile devices in the first talkgroup. By sending them immediately after one another, or even close to one another without being immediately preceding or following, the likelihood of echo due to a large gap in reception by the mobile devices is avoided.

In accordance with a second aspect of this exemplary embodiment, the GPS position of each mobile device is obtained, and the mobile devices are sorted by distance from Smart Connect Gateway 101. In accordance with a third aspect of this exemplary embodiment, the position of each mobile device is determined based on the LTE cell that the mobile device is communicating with, and the mobile devices are sorted by their LMR talkgroup affiliation and their current LTE cell. In accordance with a fourth aspect of this exemplary embodiment, the position of each mobile device is determined based on the Wi-Fi SSID (Service Set Identification), also known as the network name, and the mobile devices are sorted by their LMR talkgroup affiliation and their current Wi-Fi SSID. Additionally, the position of each mobile device can be determined based on the Wi-Fi SSIDs that the mobile device can see, and in an exemplary embodiment using the SSID that has the strongest signal strength.

In accordance with a fifth aspect of this exemplary embodiment, the position of each mobile device is determined based on a Bluetooth beacon, and the mobile devices are sorted by their LMR talkgroup affiliation and a measured distance to a common beacon. In accordance with a sixth aspect of this exemplary embodiment, the position of each mobile device is determined based on a Bluetooth beacon, and the mobile devices are sorted by their LMR talkgroup affiliation and the distance between mobile devices derived from their indoor location based on triangulation of multiple Bluetooth beacons. In accordance with a seventh aspect of this exemplary embodiment, the position of each mobile device is determined based on a Bluetooth beacon, and the mobile devices are sorted by their LMR talkgroup affiliation and the distance between mobile devices based on a method to determine indoor location, such as reporting the Bluetooth beacon with the strongest signal.

In accordance with an eighth aspect of this exemplary embodiment, the position of each mobile device is determined based on a broadband technique, such as satellite or LTE, and the mobile devices are sorted by their LMR talkgroup affiliation and their adjacency to one another. In accordance with a ninth aspect of this exemplary embodiment, the position of each mobile device is determined based on adjacency, such as that obtained by Bluetooth or Wi-Fi discovery, and the mobile devices are sorted by their LMR talkgroup affiliation and their adjacency to one another.

In accordance with a tenth aspect of this exemplary embodiment, predetermined mobile devices could be placed in a group in which the timing of the transmission to that mobile device is not important, and the audio packets can be transmitted at any point in the audio transmission cycle. For example, echo avoidance is not as important for users of mobile devices that are wearing headsets or other speakers that isolate any audio to the user only. In addition, echo avoidance is not as important for mobile devices that are installed in a vehicle.

In accordance with an exemplary embodiment, Smart Connect Gateway 101 transmits (303) the audio packets to the plurality of communication devices based upon the geographic location of each of the plurality of communication devices. In accordance with a further exemplary embodiment, Smart Connect Gateway 101 can transmit the audio packets by creating a plurality of echo-free virtual groups. These echo-free virtual groups can be based upon criteria other than location, such as current talkgroup or multigroup affiliation, whether a user of a mobile device is using a headset, whether a mobile device is currently muted, or whether the mobile device is located within a vehicle. This list is not exhaustive.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot send unicast messages to each of the talkgroup members connected to a broadband network, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server, or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as separately claimed subject matter.

We claim:

1. A method comprising:
   receiving audio packets for a group call, the audio packets intended for a plurality of mobile devices;
   determining geographic location information including a geographic location of each of the plurality of mobile devices;
   dividing the plurality of mobile devices into a plurality of created echo-free virtual groups as a function of the geographic location information in a manner to avoid echo between ones of the plurality of mobile devices co-located near one another;
   transmitting the audio packets to the plurality of echo-free virtual groups.

2. The method of claim 1, wherein the step of determining a geographic location of each of the plurality of mobile devices comprises:
   determining that mobile devices of a first echo-free virtual group of mobile devices are affiliated to a first talkgroup;
   determining that mobile devices of a second echo-free virtual group of mobile devices are affiliated to a second talkgroup;
   determining that the first talkgroup and the second talkgroup are part of an LMR multigroup; and
   wherein the step of transmitting the audio packets to the plurality of echo-free virtual groups comprises transmitting the audio packets for the second echo-free virtual group of mobile devices immediately following the audio packets sent to the first echo-free virtual group of mobile devices.

3. The method of claim 1, wherein the step of determining a geographic location of each of the plurality of mobile devices comprises:
determining that mobile devices of a first echo-free virtual group of mobile devices are affiliated to a first talkgroup;
determining that mobile devices of a second echo-free virtual group of mobile devices are affiliated to a second talkgroup;
determining that the first talkgroup and the second talkgroup are part of an LMR supergroup; and
wherein the step of transmitting the audio packets to the plurality of echo-free virtual groups comprises transmitting the audio packets for the second echo-free virtual group of mobile devices immediately following the audio packets sent to the first echo-free virtual group of mobile devices.

4. The method of claim 1, wherein the step of determining a geographic location of each of the plurality of mobile devices comprises:
determining that mobile devices of a first echo-free virtual group of mobile devices are affiliated to a first talkgroup;
determining that mobile devices of a second echo-free virtual group of mobile devices are affiliated to a second talkgroup;
determining that two or more of the second talkgroup of mobile devices scan the first talkgroup; and
wherein the step of transmitting the audio packets to the plurality of echo-free virtual groups comprises transmitting the audio packets for the two or more of the second echo-free virtual group of mobile devices immediately following the audio packets sent to the first echo-free virtual group of mobile devices.

5. The method of claim 1, wherein the step of determining a geographic location of each of the plurality of mobile devices comprises:
determining an LMR talkgroup of each of the plurality of mobile devices;
determining an estimated distance between each of the plurality of mobile devices and a Smart Connect Gateway; and
wherein the step of transmitting the audio packets to the plurality of echo-free virtual groups comprises transmitting the audio packets to the plurality of echo-free virtual groups in order based upon at least the LMR talkgroup of each of the plurality of mobile devices and the estimated distance between each of the plurality of mobile devices and the Smart Connect Gateway.

6. The method of claim 1, wherein the step of determining a geographic location of each of the plurality of mobile devices comprises:
determining an estimated distance between each of the plurality of mobile devices and a Smart Connect Gateway; and
wherein the step of transmitting the audio packets to the plurality of echo-free virtual groups comprises transmitting the audio packets to the plurality of echo-free virtual groups in order based upon the estimated distance between each of the plurality of mobile devices and the Smart Connect Gateway.

7. The method of claim 1, wherein the step of determining a geographic location of each of the plurality of mobile devices comprises:
determining an LTE cell that each of the plurality of mobile devices is communicating with; and
wherein the step of transmitting the audio packets to the plurality of echo-free virtual groups comprises transmitting the audio packets to the plurality of echo-free virtual groups in order based upon the LTE cell that each of the plurality of mobile devices is communicating with.

8. The method of claim 1, wherein the step of determining a geographic location of each of the plurality of mobile devices comprises:
determining the geographic location of each of the plurality of mobile devices using a Wi-Fi SSID (Service Set Identification) of each of the plurality of mobile devices; and
wherein the step of transmitting the audio packets to the plurality of echo-free virtual groups comprises transmitting the audio packets to the plurality of echo-free virtual groups in order based upon the Wi-Fi SSID of each of the plurality of mobile devices.

9. The method of claim 1, wherein the step of determining a geographic location of each of the plurality of mobile devices comprises:
determining the geographic location of each of the plurality of mobile devices using a Bluetooth beacon; and
wherein the step of transmitting the audio packets to the plurality of echo-free virtual groups comprises transmitting the audio packets to the plurality of echo-free virtual groups in order based upon the Bluetooth beacon of each of the plurality of mobile devices.

10. The method of claim 1, wherein the step of determining a geographic location of each of the plurality of mobile devices comprises:
determining an LMR talkgroup affiliation for each of the plurality of mobile devices;
determining the geographic location of each of the plurality of mobile devices using a Bluetooth beacon; and
wherein the step of transmitting the audio packets to the plurality of echo-free virtual groups comprises transmitting the audio packets to the plurality of echo-free virtual groups in order based upon at least the LMR talkgroup affiliation and a distance between the plurality of mobile devices derived from indoor location based upon triangulation of multiple Bluetooth beacons.

11. The method of claim 1, wherein the step of determining a geographic location of each of the plurality of mobile devices comprises:
determining an LMR talkgroup affiliation for each of the plurality of mobile devices;
determining the geographic location of each of the plurality of mobile devices using a broadband technique; and
wherein the step of transmitting the audio packets to the plurality of echo-free virtual groups comprises transmitting the audio packets to the plurality of echo-free virtual groups in order based upon at least the LMR talkgroup affiliation and adjacency between each of the plurality of mobile devices.

12. The method of claim 1, wherein the plurality of echo-free virtual groups are further created as a function of whether each of the plurality of mobile devices is wearing a headset.

13. The method of claim 1, wherein the plurality of echo-free virtual groups are further created as a function of whether each of the plurality of mobile devices is installed within a vehicle or not.

14. The method of claim 1, further comprising, transmitting the audio packets to the plurality of echo-free virtual groups responsive to determining that the group call is a system-wide call.

15. The method of claim 1, further comprising, transmitting the audio packets to the plurality of echo-free virtual groups responsive to determining that the group call includes over 1,000 participants.

16. A smart connect gateway including a processor configured to:
- receive, via an input port, audio packets for a group call, the audio packets intended for a plurality of mobile devices;
- determine geographic location information including a geographic location of each of the plurality of mobile devices;
- divide the plurality of mobile devices into a plurality of created echo-free virtual groups as a function of the geographic location information in a manner to avoid echo between ones of the plurality of mobile devices co-located near one another;
- transmit, via an output port, the audio packets to the plurality of echo-free virtual groups.

17. The smart connect gateway of claim 16, wherein the plurality of echo-free virtual groups are further created as a function of whether each of the plurality of mobile devices is wearing a headset.

18. The smart connect gateway of claim 16, wherein the plurality of echo-free virtual groups are further created as a function of whether each of the plurality of mobile devices is installed within a vehicle or not.

19. The smart connect gateway of claim 16, the processor further configured to transmit the audio packets to the plurality of echo-free virtual groups responsive to determining that the group call is a system-wide call.

20. The smart connect gateway of claim 16, the processor further configured to transmit the audio packets to the plurality of echo-free virtual groups responsive to determining that the group call includes over 1,000 participants.

* * * * *